United States Patent [19]

Scarpa et al.

[11] Patent Number: 5,656,373

[45] Date of Patent: Aug. 12, 1997

[54] NON-SHRINKING, NON-SWELLING, CELLULOSE BODIES FOR CHROMATOGRAPHY

[76] Inventors: Ioannis Scarpa, 6116 Hermitage, Chicago, Ill. 60660; Bozidar Stipanovic, 608 E. Longwood, Lake Forest, Ill. 60045

[21] Appl. No.: 180,542

[22] Filed: Jan. 11, 1994

Related U.S. Application Data

[63] Continuation-in-part of Ser. No. 123,184, filed as PCT/US93/00197, Jan. 11, 1993, abandoned, Ser. No. 818,925, Jan. 10, 1992, abandoned, and Ser. No. 778,188, filed as PCT/US90/03716, Jun. 29, 1990, Pat. No. 5,245,024, which is a continuation-in-part of Ser. No. 374,281, Jun. 30, 1989, abandoned.

[51] Int. Cl.$^6$ ..................................... C08B 16/00
[52] U.S. Cl. ........................ 428/402; 525/54.3; 536/57
[58] Field of Search ....................... 106/198; 536/57, 536/61, 56, 84, 92, 98; 525/54.21, 54.1, 54.3; 530/403, 404, 405, 814; 436/530; 428/402

[56] References Cited

U.S. PATENT DOCUMENTS

| | | |
|---|---|---|
| 2,543,928 | 3/1951 | O'Neill et al. |
| 4,055,510 | 10/1977 | Peska et al. ............................. 252/426 |
| 4,902,792 | 2/1990 | Okuma et al. ............................ 536/57 |
| 4,946,953 | 8/1990 | Okuma et al. ............................ 536/57 |
| 5,245,024 | 9/1993 | Scarpa et al. ............................ 536/56 |

*Primary Examiner*—Jeffrey C. Mullis
*Attorney, Agent, or Firm*—Frederick J. Otto; Jack Larsen

[57] ABSTRACT

Disclosed are small particles of cellulose which are useful for liquid chromatography supports, and the like. Disclosed are methods for making small, substantially spherical bodies with a near complete absence of irregularities, holes, cracks, and the like. This is made possible by a new process wherein the coagulation of viscose is carried out before any regeneration is allowed to begin. This method is of general utility applying also to the production of rayon fiber and cellophane film.

36 Claims, 6 Drawing Sheets

NON-SHRINKING, NON-SWELLING, CELLULOSE BODIES FOR CHROMATOGRAPHY

This application is a continuation in part of U.S. application Ser. No. 08/123,184 filed Sep. 14, 1993, now abandoned and is a continuation in part of U.S. application Ser. No. 07/818,925, filed Jan. 10, 1992, now abandoned, which is the national phase of PCT/US93/00197, filed Jan. 11, 1993 and is also a continuation in part of U.S. application Ser. No. 07/778,188, filed Dec. 30, 1991, which is the national phase application of PCT/US90/03716, filed Jun. 29, 1990, now U.S. Pat. No. 5,245,024, which was a continuation in part of U.S. application Ser. No. 07/374,281, filed Jun. 30, 1989, now abandoned.

Copending application Ser. No. 08/123,184 relates to an improved process for making a support for liquid chromatography comprising substantially spherical particles of cellulose which exhibit properties and a structure previously unknown in such supports, importantly, a smooth, dense, outer skin of cellulose which exhibits no holes or pores into the interior discernible at a magnification of 25,000×. This skin reduces very appreciably the chemical reactivity of the cellulose matrix hydroxyl groups and does not allow the activation of the surface by the usual chemical procedures such as soaking the beads in 0.5–2 molar sodium hydroxide without breaking the structural integrity of the beads. According to the instant invention, surface hydroxyl groups may now be activated by soaking the beads in aqueous or organic polar and non-polar solvent solutions of tetrabutylammonium hydroxide. Beads so activated are reactive with bis oxiranes, chlorotriazines, epichlorohydrine, and other bifunctional reagents.

This application relates to, and claims, beads of cellulose made from viscose; and improved rayon fiber, film, and improved uncrosslinked, high density, spherical cellulose chromatography support beads without substantial holes, voids, or craters on their surfaces. Said fibers, film, and beads are substantially free from open-cell structures connected with an outer skin, resulting in smooth surfaces. Said beads can be produced in sizes from 300 micrometers down to as small as a micrometer. There is no reason to suppose that they may not be made larger or smaller still.

A relatively narrow distribution of sizes can be achieved around a nominal diameter, the nominal or average diameter being controlled primarily by the selections of emulsifying agent and surfactant and by varying other controlling factors such as the selection of water-immiscible solvent, order of addition, and the rate of mixing.

BACKGROUND OF THE INVENTION

U.S. Pat. No. 4,946,953 to Okuma and U.S. Pat. No. 4,055,510 to Peska et al. provide an understanding of the background of the invention. Both teach the making of porous, swellable, spherical, reconstituted cellulose gel particles. U.S. application Ser. No. 07/374,281, filed Jun. 30, 1989 by two of us, Scarpa and Beavins, issued as U.S. Pat. No. 5,245,024, Sep. 14, 1993, directly relates to the problems addressed by this application. The substance of that application was published Jan. 10, 1991 with the entry into the National Phase of the corresponding PCT Application No. PCT/US90/03716 Publication No. W091/00297 is incorporated by reference herein.

Cellulose and cellulose derivatives long have been used as chromatographic supports and as filtration media. General chromatographic uses include analytical and preparative column liquid chromatography, thin-layer chromatography, ion exchange and gel chromatography, and chelation and affinity sorbents. Additionally, cellulose particles have numerous other uses in the pharmaceutical, food, and cosmetics industries.

Cellulose is a naturally-occurring polymer of 1,4-beta-linked glucose monomers. In the native state, polymeric glucose chains are extensively hydrogen-bonded to each other in some regions and less hydrogen-bonded in others. The regions of relatively high hydrogen bonding are generally referred to as "microcrystalline regions", while the less hydrogen bonded regions are referred to as amorphous regions. The newly discovered smooth skin is neither wholly crystalline nor purely amorphous, but, under illumination with polarized light, reveals some orientation, indicating a degree of order in the skin, which we speculate is related to the formation at the interface of solvent and viscose, and related to the property of the skin to change its chemical activity.

Originally cellulose fibers were used in chromatography, but the need to improve the rate of flow led to the rise of microcrystalline cellulose as the medium of choice. Procedures typically used to prepare microcrystalline cellulose generally result in aggregated particles which may be comminuted by grinding and then separation by particle-size, commonly referred to as "classification", yields a medium suitable for some chromatographic purposes. The resulting individual microcrystalline cellulose particles are relatively irregularly shaped and fragile, which features adversely affect the use of these types of materials in chromatographic beds or columns. Because microcrystalline cellulose tends to break down and generate fines, resulting sorbent beds are prone to clogging and compacting when columns are subjected to elevated pressure. These drawbacks can result in unacceptable flow characteristics and poor chromatographic separations.

In order to overcome swelling and poor flow characteristics, Okuma reports in U.S. Pat. No. 4,946,953 the use of crosslinked cellulose beads as a desalting chromatographic medium for protein purification. Those beads were resistant to medium pressure and offered a reasonably good flow rate.

The Scarpa-Beavins procedure as disclosed in U.S. Pat. No. 5,245,024 produces spherical, dense, uncrosslinked beads of a narrow size distribution which resist moderate pressures when tested with beads of 30 to 90 microns diameter. These beads typically do, however reveal some surface porosity in the form of cracks, voids, and unevenly distributed holes or channels of varying diameters. Such structural irregularities can lead to loss of resolution when separating biomolecules or other macromolecules due to their diffusion into the interior of the beads.

As discussed earlier, crosslinking yields a new polymer, consisting of crosslinked cellulose chains, thereby rendering the beads more mechanically stable, but also such crosslinking increases the cost of the support, complicating the manufacturing processes, thereby limiting the general utility of use of such support.

Porous, uncrosslinked cellulose particles, such as disclosed in Peska, when placed in aqueous solutions typically swell significantly. Swollen, porous cellulose beads are sensitive to changing ionic strengths in elating buffers and solvents and do not withstand high pressure gradients. As a result, known swellable cellulose supports may therefore be used only within a specified range of ionic strengths. If this specific range of ionic strengths is exceeded, the swelled cellulose particles compact or shrink which results in very poor flow characteristics and leads to either poor chromatographic separations or to no separations at all.

A great many methods of preparing spherical cellulose particles are known. Japan patents 73'21m738 and 73'60,753 extrude a viscose at high speed through a nozzle into a spinning acidic coagulation bath. The thermal decomposition of the sodium cellulose xanthate results in porous particles as disclosed in Peska et al, U.S. Pat. No. 4,055,510. Scarpa-Beavins U.S. Pat. No. 5,245,024 application Ser. No. 07/374,281 discloses a process for the making of substantially spherical, high-density-cellulose particles by the steps of forming a stable emulsion of high-molecular-weight viscose, using at least one emulsifying agent and a water immiscible liquid carrier of suitable viscosity at a temperature typically between 20 and 30 degrees C., by slowly aging and coagulating the cellulose xanthate while the beads are kept in suspension by stirring. Finally, cellulose is regenerated by contacting the coagulated beads with acid solutions. Beads made according to the method just described, being solid and microporous with relatively few larger voids and holes, do not shell appreciably when contacting aqueous solutions of varying salt concentration.

Never-the-less when following the teachings of the Scarpa-Beavins U.S. Pat. No. 5,245,024 to produce larger batches (represented by the Examples 1), that is, 50 liter batches and larger, it was found that the time needed for coagulation of beads becomes prohibitively long. In addition, it is evident from electron micrographs, such as FIG. 5b of a fractured bead, that the interior of the beads is sparsely populated with holes, some of which reach 5,000 Å (Angstroms) in size, and channels connecting holes with the surface. In certain instances, as where ligands are attached, chromatographic separation can be optimized when substrate/sorbent interactions take place exclusively on the outside surface of the bead. In such cases, the presence of any holes of a size that may accommodate a substrate molecule cannot be tolerated; otherwise diffusion-based interferences may adversely affect resolution of pure compounds. The inventions for which this continuing application is submitted arose from our efforts to eliminate the holes and voids in the final bead product, that may have access to the liquid phase as well as to shorten the reaction time required for coagulation of the beads. Since the filing for Scarpa-Beavins U.S. Pat. No. 5,245,024, we have learned that a modification of the methods disclosed therein results in a new form of cellulose bead, spheroidal in shape, with a smooth, strong skin, which skin, of oriented cellulose, is impervious to nitrogen (under conditions of the BET method for measuring surface area), and effectively non-swelling in aqueous solutions.

SUMMARY OF THE INVENTION

It is an object of the invention to overcome one or more of the problems listed above. Another object of this invention is to provide new means, general in scope for the reconstitution of cellulose with outer surfaces essentially void-free and being dense, crush resistant to yield novel beads, filaments, fibers, and films.

The invention contemplates five bead-making processes and the bead products produced thereby:

(A) A method of forming a viscose water-in-oil emulsion by mixing incoming streams of viscose and oil-surfactant solution, respectively, in a high energy mixing device, followed by coagulating the surfaces of the viscose droplets by neutralizing the excess of caustic soda by a carbonic acid ester;

(B) A method of forming a viscose water-in-oil emulsion as in process A, whereby now the surfaces of the droplets are more quickly hardened when contacted by an excess of an essentially anhydrous alcoholic salt solution;

(C) A method of forming a viscose water-in-oil emulsion by an inversion process, whereby oil/surfactant solution is added in small increments into viscose which is being mixed at a low speed by a planetary mixer (i.e. dough mixer), causing at some point a thick phase (liquid crystalline state) which upon further addition thins out indicating an inversion of oil-in-water state, thereby resulting in viscose water-in-oil emulsion of uniform droplets, the surfaces thereof are subsequently quickly hardened and rendered non-sticky when contacted with an excess of an essentially anhydrous alcoholic salt solution, as in Method B;

(D) To prevent irreversible formation of swollen gels the coagulated, non-sticky intermediates formed in processes A, B & C are contacted with dehydration concentrated alcoholic and aqueous salt solutions also thereby removing by-products, that may liberate gases upon regeneration with acid, resulting in dense, non-swelling beads without irregular holes or channels at their surfaces; and, (E) A method of attaching long hydrophilic arms ranging in molecular weight from 600 to 6000 Daltons, or larger onto the relatively unreactive surface of such beads to which various, known chromatographic ligands can be attached which facilitate the separation of large biomolecules.

(F) A still further object of the invention is to produce other forms of regenerated cellulose, namely films and filaments, with improved properties resulting from the elimination of voids, making possible, for example, stronger fibers, which can be used for manufacturing improved rubber reinforcing cords. To create void-free cellulose films, fibers, and filaments extruding raw technical viscose into concentrated non-aqueous anhydrous salt solutions, contacting the coagulated intermediate bodies with aqueous and alcohol salt solutions as in (C) and regenerating to cellulose to yield an improved rayon and cellophane. Other objectives and features of the invention will in part be obvious, and in part be apprehended from the following detailed description and the appended FIGURES of which:

DETAILED DESCRIPTION OF THE INVENTION

Viscose Coagulation by Buffering of pH

It might be expected that lowering of its pH would destabilize viscose to a point that it would become insoluble when acids are carefully added to a viscose emulsion. In our experiments, however, no matter how carefully acid was added to the emulsion it always resulted in quick formation of a glob by flocculation and fusion of sticky viscose droplets before the surface skin could have been formed. Very weak acids like carbon dioxide that may lead to gradual buffering of caustic solution were also tried and gave somewhat encouraging results. But to achieve a precise metering of gaseous $CO_2$ into the emulsion presents a problem. Therefore we have accomplished neutralization by addition of an ester of carbonic acid that hydrolyzes under alkaline conditions and liberates $CO_2$, thereby neutralizing the excess of caustic soda, NaOH, in the viscose solution, in accordance with the following reaction:

This reaction results in buffered viscose thereby causing insolubility of the cellulose xanthate. For this purpose, from a number of available carbonic acid esters, we have selected a very convenient carbonate ester, propylene carbonate, a commercially available and economically priced solvent. Both propylene carbonate itself and the product of its hydrolysis, propylene glycol, are viscous materials with low flammability and toxicity. Such carbonate esters can be precisely metered in required quantities into emulsions in order to achieve a desired effect, i.e. coagulation and hardening of cellulose xanthate at the surface.

This method is a convenient way to cut down the time for production of beads, but it is dependent on the age of viscose (also referred to as ripening). Both green and very ripe viscose, respectively, do not respond to this method very easily, but moderately ripe viscose solutions can result very quickly (in less that one hour) in filterable beads that can subsequently be reconstituted into desirable compact microspherical cellulose beads.

Emulsion Breaking and Simultaneous Dehydration of Viscose

The method according to teachings of the Scarpa-Beavins patent calls for an organic fluid as a carrier for formation of a reversed water-in-oil emulsion. A composition which creates the emulsion, we term a primary emulsifier, while those which serve to stabilize the emulsion, we term "secondary" emulsifiers. For emulsifications and stabilization of such reverse viscose emulsion in an organic, water-immiscible fluid, anionic, cationic and nonionic surfactants, can be used as primary emulsifiers. Also anionic, cationic and nonionic polymers, linear and/or globular can be used as protective colloids in conjunction with said primary emulsifiers or such colloids may sometimes be used as sole emulsifying systems. The carrier fluid has a viscosity sufficiently high in order to keep viscose droplets in suspension for reasonably long periods of time and until the skin on the outside of each droplet is formed, thereby creating beads. Before filtering out coagulated beads, the viscosity of the emulsion is reduced, usually by addition of a light solvent, such as hexane. If, for whatever reason, some beads are not completely cured and the surface skins of the individual beads are not sufficiently hardened, settled beads adhere to each other, creating agglomerations of coalesced beads. As a remedy, to avoid a lengthy process of coagulation whereby skin is left to form at its own rate, a method was developed to break down and thin the emulsion quickly in order to separate beads, and at the same time form a skin by dehydrating the surface of the droplets, thereby insolubilizing almost instantaneously the cellulose xanthate. This is accomplished by breaking the emulsion with a highly concentrated ethanolic salt solution. Among salts that have high solubilities in ethanol, potassium acetate and magnesium chloride were the salts of choice. As a dispersion fluid disclosed in the Scarpa-Beavins U.S. Pat. No. 5,245,024 and the PCT publication, viscous solvents had to be used in order to slow the settling of beads until the skins hardened. In this new method, which greatly accelerates skin formation, a high rate viscosity of dispersion fluid is no longer of concern and any of numerous non-polar solvents can be used for emulsification of viscose as long as they are miscible with salt-dissolving solvents.

Figure 1:
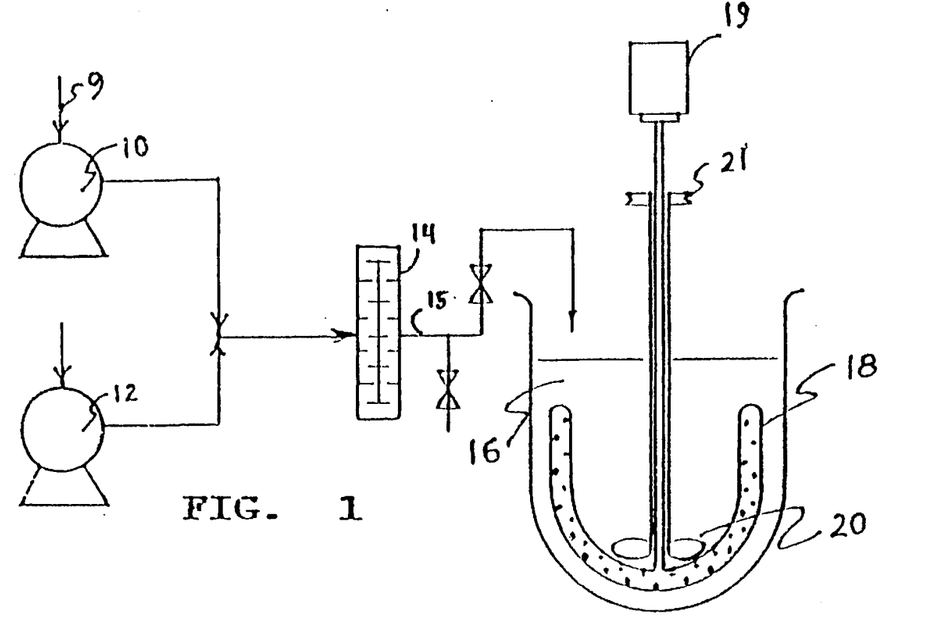
FIG. 1 is a schematic diagram of apparatus for the practice of the invention on pilot scale, using a high energy mixing device.

According to FIG. 1, a surfactant mixture from a first pump 10 is fed with viscose 11 by a second pump 12 to a mixer 14, from which the resulting emulsion 15 is discharged to a jacketed tank 16 with two coaxial stirrers 19 and 21, with a perforated paddle 18 driven at slow speed, and a propeller 20 driven at high speed. When, as disclosed in the Scarpa-Beavins U.S. Pat. No. 5,245,024 coagulation with stirring produces a non-sticky skin on the beads, the contents are then diluted with hexane. After the settling, solvents are decanted, and beads are slurried in ethanol, filtered and washed.

It is important to have a large excess of ethanolic salt solution in order to prevent thickening of the emulsion prior to emulsion breaking. Therefore, an inverse addition of viscose emulsion to the alcohol salt solution was attempted. That proved to be the right method, resulting in a quick separation and precipitation of beads, without agglomeration or thickening. Apparently, on dilution of a viscose-in-oil emulsion with a concentrated alcoholic solution of an anhydrous salt, very fast dehydration of cellulose xanthate on the surface of individual droplets takes place, thereby insolubilizing the contacted viscose and effectively forming a hardened surface skin that is no longer sticky. The method appears to be general and independent of the fluid used to prepare the viscose-in-oil emulsion. Also the method is independent of ripeness of the viscose used for emulsion preparation; since breaking the emulsion can now effectively be done immediately after emulsification state. In-line mixers can be used thereby enabling a continuous process for cellulose bead production.

Figure 1A:
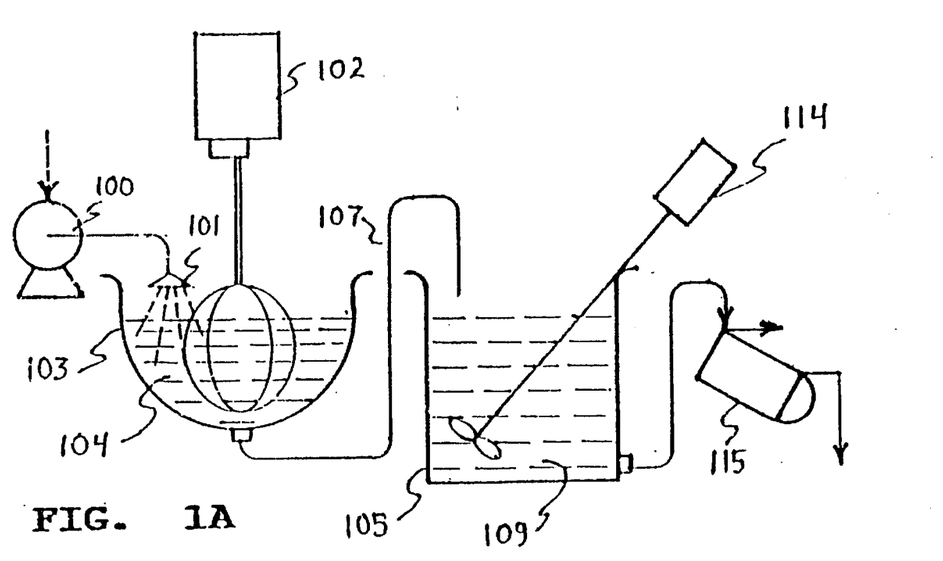
FIG. 1A. is a schematic diagram of apparatus for the practice of the invention on pilot scale, using an inversion method.

FIG. 1A. is a schematic diagram of apparatus for making viscose water-in-oil emulsion by an inversion method. Oil-surfactant solution is fed by a pump 100 by a spray 101 at a controlled rate into a planetary mixer assembly (Hobart® type) 102 which mixes the viscose in a bowl 103 at low speed. That same speed is maintained when emulsion is going through a thick, liquid crystalline phase. Once the emulsion thins out, the lowest mixing speed is maintained while the contents 104 are pumped through tube 107 into the salt-alcohol tank 105. The contents 109 in the tank 105 are mixed by Lightning™ mixer 114. Separation of the beads from the mother liquor is accomplished by using a centrifuge 115.

Figure 2:
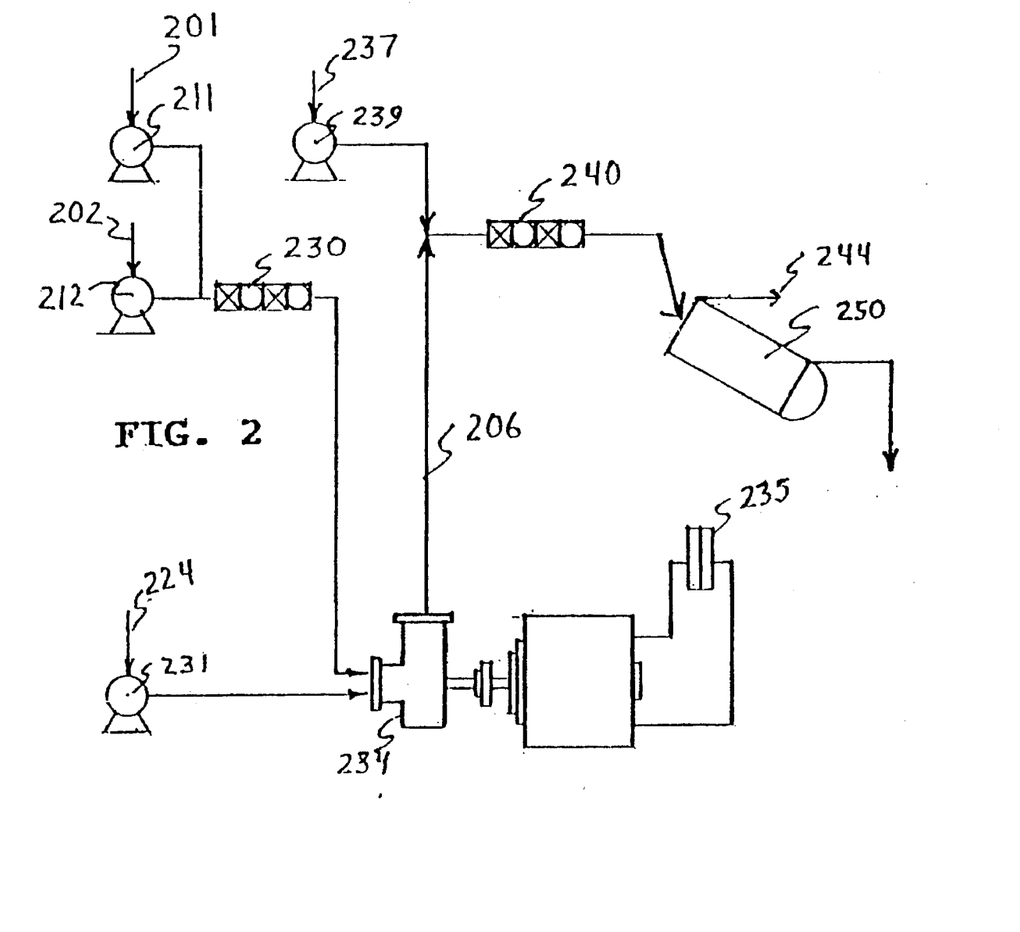
FIG. 2. is a schematic diagram of apparatus for the practice of the invention as a continuous process.

Referring now to FIG. 2, it shows an apparatus for a continuous process of bead production. The emulsifier/surfactant mixture 201 from a first pump 211 is mixed in required proportions with a water-immiscible fluid 202 from a second pump 212 through a static mixer 230. The resulting mixture is simultaneously fed with viscose 204 from a third pump 231 into an in-line mixer 220 equipped with a speed regulator 235 to control the average size of the beads to be produced. The emulsion 206 produced in this manner is then mixed with alcohol-salt solution 207 from a fourth pump 239 through a static, or other in-line mixer 240. Thus contacted with salt-alcohol solution the resulting hardened beads 244 are separated from mother liquor 209 by a continuous centrifuge 250 and then are further washed and regenerated.

Method for Preparation of Cellulose Beads with Hole-Free Surfaces

Coagulation of viscose results in the formation of an insoluble cellulose xanthate. Said xanthate, being a polyelectrolyte, can be highly hydrated and swells in water to over 200% of its original volume. Regenerating cellulose by contacting xanthate with aqueous acids does not yield a compact, solid cellulose material. Another problem with regeneration of cellulose from insoluble cellulose xanthate stems from gaseous products, mainly $H_2S$ and $CS_2$, that are liberated on contact with acid and are responsible for formation of large holes, voids, channels and cracks.

To prevent formation of pores and craters in the hardened bead shell due to liberated gaseous products special methods of washing separated beads have been developed. The first objective is to remove sulfur-based, gas forming impurities and by-products from the beads by thorough washing, leaving cellulose xanthate. Cellulose xanthate purified in such a manner produces hardly any gaseous products when contacted with acid. The second objective of this washing is to prevent the irreversible formation of gels which occurs when coagulated cellulose xanthate gets in touch with deionized or low salt content water. This is achieved by never contacting said cellulose xanthate with water alone; instead, alcoholic salt solutions of at least 25% concentration and aqueous salt solutions of at least 35% concentration are used for all washings. The use of 25% salt in alcohol removes some sulfur based impurities and severely restricts swelling of the beads, especially when used directly before washing with alcohol alone and followed by regeneration with alcoholic acid solution. Such salts (like potassium acetate) can be made more alkaline by addition of some sodium or potassium hydroxide. Alternatively, aqueous salt solutions of at least 35% salt concentration effectively remove the sulfur-based impurities, while limiting the swelling of beads to an average of no more than approximately 10% of their original volume. After washing sulfur-based impurities and by-products with an alcoholic salt and/or aqueous salt solution, beads are washed with alcohol which replaces water and removes excess salt. Finally, since regeneration with aqueous acids also causes swelling (cellulose xanthate hydrates almost instantaneously on contact with dilute aqueous acid solutions), the alcohol-washed beads are then contacted with alcoholic acetic acid (other acids can also be used organic carboxylic acids, organic sulfonic acids and inorganic acids) thereby regenerating cellulose without swelling. After regeneration of cellulose, beads may also be bleached with 6% hydrogen peroxide in a buffered 5% sodium phosphate solution (pH 7) by stirring them at room temperature for 1.5 hours, and thoroughly washing them successively with water, alcohol and acetone.

Attempts to activate the skin hydroxyls without disrupting the structural integrity of the cellulose beads, prepared by the method of the instant invention, proved difficult when using conventional chemistries. Bifunctional agents and spacer arms can be bonded to the surface after treatment with relatively low concentrations, of 0.1 to 0.2M tetrabutylammonium hydroxide solutions in water, alcohols or non-polar solvents.

Strong sterically hindered organic bases in a variety of solvents can also be used to activate surface cellulose and to introduce spacer arms to the inert surface. Using the above-mentioned techniques, short bifunctional spacer arms were introduced to the surface through stable covalent linkages: 1,4-butane diglycidyl ether, epichlorohydrine, chloroacetic acid and various forms of chlorotriazines are examples of the bifunctional spacers which can be grafted to the surface.

Long arms, particularly alpha, omega diamino polyethylene glycols are now added to the bifunctional spacers using conventional chemical techniques. The long arms described in this application range in molecular weight, from 400 to 6,000 Daltons. The degree of substitution was arrived at by determining the primary amine concentration which ranges between 4 and 20 micromoles per milliliter of bed.

Figures 4, 5A, 5B, 6:
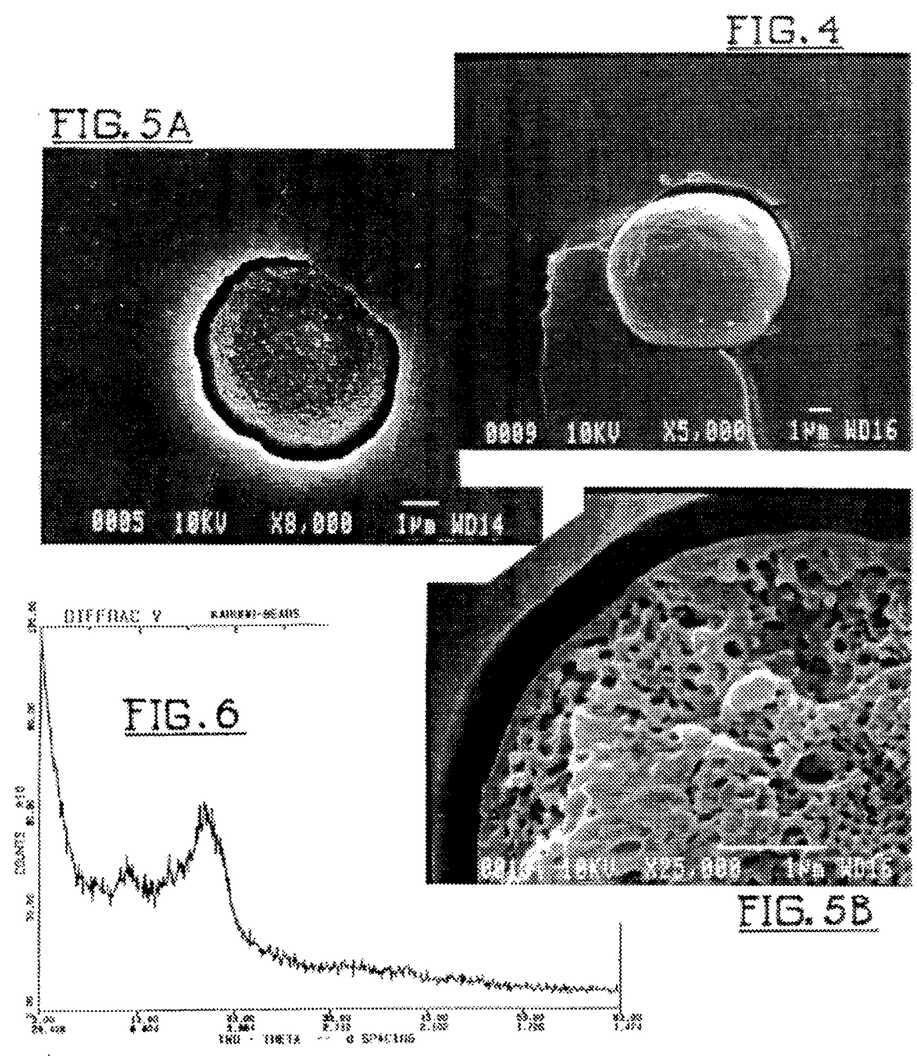
FIG. 4. displays an electronmicrograph of the bead surface at 5,000× magnification.
FIG. 5a displays an electronmicrograph of a bead section at 8,000× magnification.
FIG. 5b displays an electronmicrograph of a bead fractured section at 25,000× magnification.
FIG. 6. is a X-ray diffraction pattern obtained from examining beads produced using Example 9.
Figure 7:
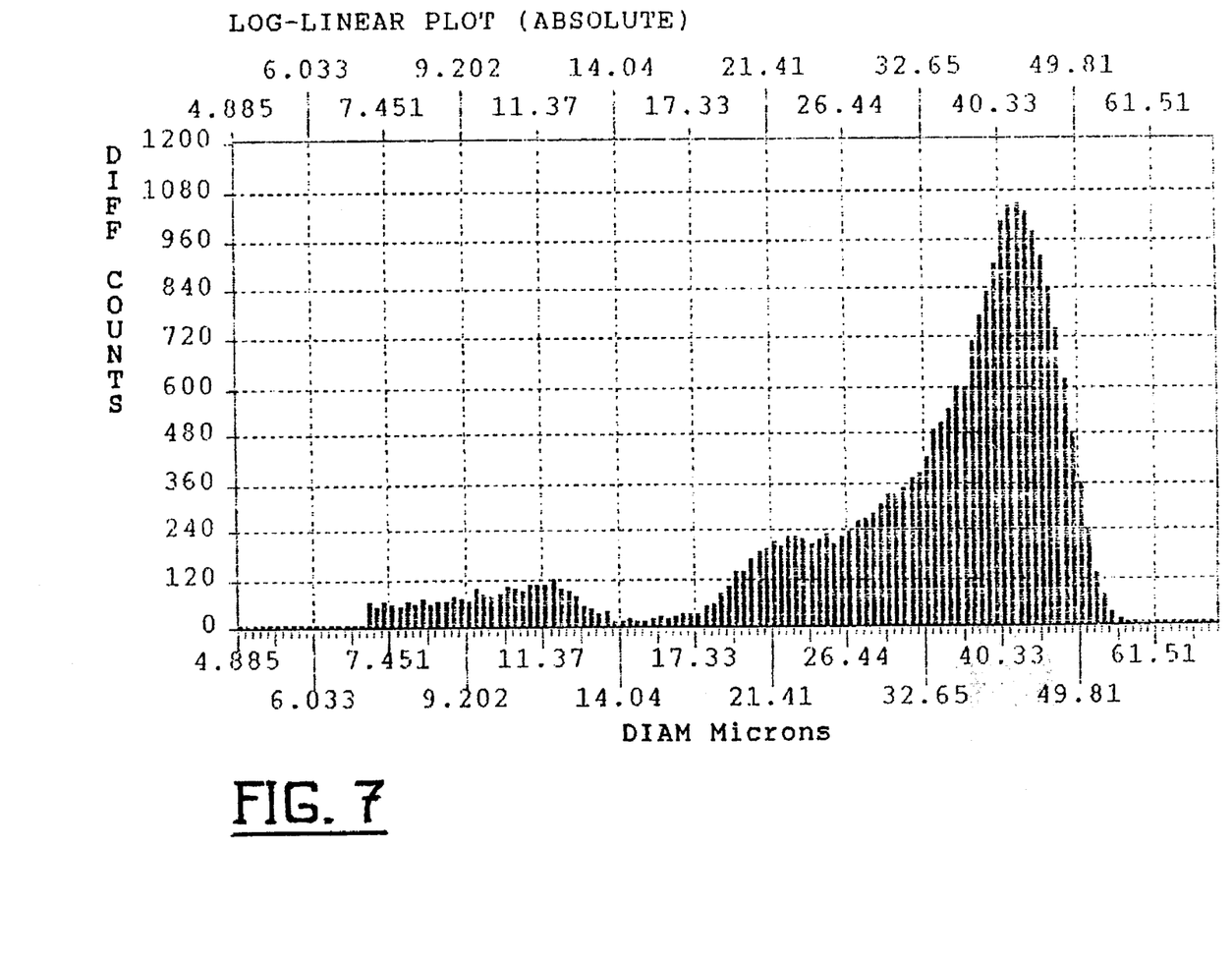
FIG. 7. is particle size distribution histogram obtained from examining beads produced by Examples 4 and 5.

The new cellulose particles generated through this invention are characterized by the following:

a) They are essentially non crystalline as determined by x-ray diffractometry;

b) All beads display some degree of orientation as determined by polarizing microscopy;

c) Electron micrograph sections of the beads mounted in epoxy matrix display a structure whereby the cellulose beads show a dense non-porous outer shell with an approximate thickness of 1,000 to 2,000 Å and a more porous interior of the closed-cell type;

d) The surface area as determined via classical nitrogen techniques known as BET gives a surface area value of only 0.8 square meters per gram. On the other hand FIG. 5 B indicates an extremely porous interior that is not correspondingly reflected in measured surface area. Evidently, this apparent paradox is a result of the impervious outer skin and respectively of the walls of interior closed-cell type pores;

e) In shape, the beads are essentially spheroidal;

f) The preparations of particles wherein the average diameter is thirty-five microns or less display very narrow distribution ranges;

g) The structural features of the cellulose beads provided by this invention are non-swellable and stable in a pH range between 1 and 13;

h) Spacer molecules such as bis oxiranes and various forms of triazines react with matrix hydroxyl groups after treatment of the matrix with tetrabutylammonium hydroxide in aqueous or non polar solvents. Strong sterically hindered organic bases in a variety of organic solvents can also be used to activate the surfaces;

i) The spacer molecules are utilized to introduce long, hydrophilic, linear bifunctional groups comprising essentially polyethylene glycol, capped on both ends by the primary amino functionality. The linear bifunctional groups range in molecular weight from 600 to 6,000 Daltons;

j) A column 1×20 cm packed with sized beads, 40–60 micron diameter, is connected to a system delivering water under pressure. The relationship between flow with increasing pressure remains linear up to at least 100 psi. The linear flow velocities per hour for various pressure ratings are as follows:

573 cm/hr at 16 psi;

1,763 cm/hr at 50 psi; and 3,057 cm/hr at 102 psi; and k) In addition to reconstituted cellulose obtained from cellulose xanthate solutions of plant origin similar methodologies can be applied to obtain reconstituted cellulose from cellulose xanthate solution of bacterial origin i.e. Weyerhaeuser's Cellulone®, which could lead to novel cellulosic material.

The diffraction spectrogram FIG. 6. shows a broad main peak indicating that the crystallite size of the sample measured is extremely small. The sharp diffraction peak (located at about 16.3 degrees two theta d-spacing of 5.4 Å) indicates the presence of another phase in our sample. This diffraction line possibly emanates from the skin of the particles.

The results using polarizing microscopy can be summarized as follows: Crossed bipolar views show that all particles have some orientation. The bright field images show that many of the larger spheres display inclusions and viscerals within. It is difficult to determine at present whether the oriented cellulose molecules occur on the skin of the beads, in the inside, or both.

The electromicrographs are consistent with the expectations of the inventors. FIG. 4 demonstrates the smoothness of the surface which is formed rapidly after immersing the emulsion particles in the concentrated alcoholic salt solution. FIG. 5 A. shows the lack of crater-like holes of sizes in the vicinity of 5,000 Å which were evident before developing the new washing and cleaning process. FIG. 5 B. shows the presence of a skin of about 1,000 to 2,000 Å on the outside and a more porous, closed, single-cell type structure in the interior.

Surface area was determined via the classical nitrogen adsorption technique known as the B.E.T. method. The very low value of 0.8 square meters per gram is consistent with the dense outer skin character of the cellulose beads which is specifically impervious to nitrogen.

The cellulose beads generated by the methods described in this patent application display exceptional structural stability over a wide pH range. A 150 mg sample of cellulose as described in examples 4 and 5 below is suspended in 10 ml of 50% formic acid and stirred under boiling conditions. No visible change occurs to the cellulose beads after boiling for six hours. The experiment was repeated as described above, this time in a pressure vessel which was placed in an oil bath at 140 degrees C. Overnight heating of the cellulose beads resulted in an approximate 400 per cent increase in volume due to swelling.

A 1 ml volume of beads was suspended in a solution of sodium hydroxide at pH 12. The volume expanded to approximately 1.06 ml, and remained constant over a period of 28 days.

A volume of 1 ml well packed beads was suspended in a sodium hydroxide solution at pH 14. Swelling is discernible after six hours and reaches a maximum volume change of 120% within four days of standing.

TABLE I

| Geometric Mean Size: | 31.34 | um | --PERCENTILES-- |
|---|---|---|---|
| Geom. Std Deviation: | 1.582 | um | 0.100% Counts above 55.56 μm |
| Geom. Skewness: | −6.534 | | 1.000% Counts above 51.60 μm |

TABLE I-continued

| Geom. Coeff Variation | 5.049 | | 6.000% Counts above 48.00 μm |
|---|---|---|---|
| | | | 22.00% Counts above 43.36 μm |
| Arithmetic Mean Size: | 34.07 | um | 50.00% Counts above 36.99 μm |
| Median Size: | 36.71 | um | 78.00% Counts above 25.05 μm |
| Mode Size: | 41.68 | um | 94.00% Counts above 10.74 μm |
| Kurtosis: | 3.937 | | 99.00% Counts above 7.544 μm |
| Arith Std Deviation | 11.74 | um | 99.90% Counts above 6.948 μm |

TABLE II

| Geometric Mean Size: | 2.557 | um | --PERCENTILES-- |
|---|---|---|---|
| Geom. Std Deviation: | 1.896 | um | 0.100% Counts above 10.71 μm |
| Geom. Skewness: | 0.254 | | 1.000% Counts above 8.781 μm |
| Geom. Coeff Variation | 74.13 | | 6.000% Counts above 6.886 μm |
| | | | 22.00% Counts above 4.585 μm |
| Arithmetic Mean Size: | 3.118 | um | 50.00% Counts above 2.503 μm |
| Median Size: | 2.472 | um | 78.00% Counts above 1.486 μm |
| Mode Size: | 2.075 | um | 94.00% Counts above 0.953 μm |
| Kurtosis: | 2.348 | | 99.00% Counts above 0.656 μm |
| Arith Std Deviation | 2.063 | um | 99.90% Counts above 0.522 μm |

TABLE III

| Geometric Mean Size: | 9.434 | um | --Percentiles-- |
|---|---|---|---|
| Geom. Std Deviation: | 1.760 | um | 0.100% Counts above 26.83 μm |
| Geom. Skewness: | −2.409 | | 1.000% Counts above 23.17 μm |
| Geom. Coeff Variation | 18.66 | | 6.000% Counts above 19.47 μm |
| | | | 22.00% Counts above 15.21 μm |
| Arithmetic Mean Size: | 10.84 | um | 50.00% Counts above 10.41 μm |
| Median Size: | 10.26 | um | 78.00% Counts above 6.117 μm |
| Mode Size: | 13.67 | um | 94.00% Counts above 3.500 μm |
| Kurtosis: | 2.294 | | 99.00% Counts above 2.003 μm |
| Arith Std Deviation | 5.410 | um | 99.90% Counts above 1.167 μm |

EXAMPLES

A detailed description of the experiments involved in this invention is given below, preceded by methods used in measuring the various properties described in the specifications.

Measurement of Molecular Order and Physical Characterization

X-Ray measurements

The experiment was conducted on a Siemens® D-500 X-ray diffractometer. The diffractometer was configured with medium resolution slits (0.15 degree sector slit) and a diffracted beam monochromator. A copper X-ray tube was used for the experiment and it was operated at 45 kV and 25 mA. The diffractometer is fully computer controlled and was operated in a step scan mode that produced a scanning rate of about 0.5 degrees per minute. The test specimen was rotated (35 rpm) in the X-ray beam. The test specimen was prepared by applying a thin coating of the sample to a zero background sample holder (essentially a single crystal of quartz cut in a special crystallographic direction). This type of sample preparation procedure generally produces specimens that are nearly randomly oriented, however, the specimen is not infinitely thick to the X-ray beam in the back reflection region of the diffractogram (i.e., high two-theta values).

B.E.T. Measurements

Surface area was determined via the classical nitrogen adsorption technique know as the B.E.T. method. A Micromeritics Flowsorb Model 2300 was used to generate an adsorption isotherm from three precisely blended gas mixtures of nitrogen and helium according to standard methodology. Prior to analysis, the sample was surface-conditioned by heating it to 65 degrees C. for one hour. Specific surface area was calculated via standard data mathematics associated with B.E.T. analysis.

Polarizing Microscopy Measurements

Photomicrographs were obtained with a polarizing microscope. Some photographs were taken in bright field in plane polarized light. Other photomicrographs were taken with crossed polar and a first order red (530 nm) compensator.

Measurement of Particle Size Distribution

About 0.1 g of sample is put in a saline solution and measured using an Electrozone particle analyzer. According to the Coulter principle this method has a working range of about 0.5 to 400 microns diameter. A typical statistical report is composed of a population base of approximately 250,000 particles over the analytical range with the data being presented on the basis of the equivalent spherical diameter or differential volume percentile. See Tables I, II and III.

Figure 3:
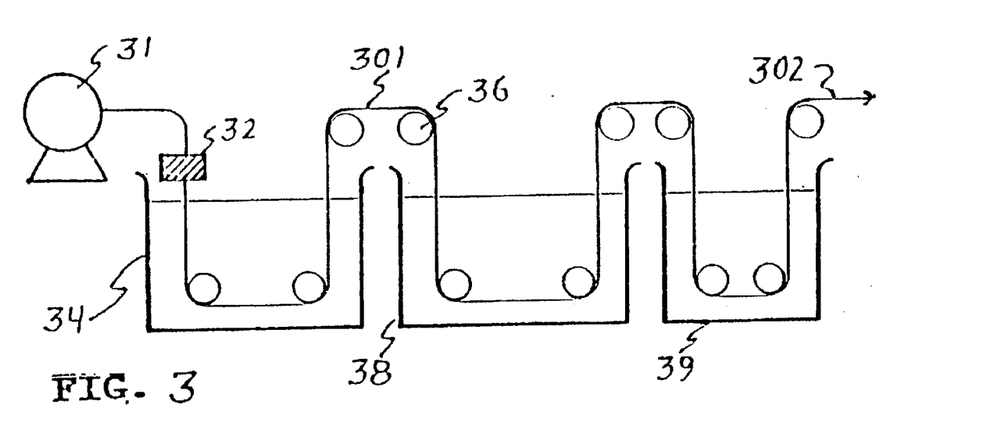
FIG. 3. is a schematic diagram of apparatus for the practice of the invention to make improved, stronger rayon fibers; and stronger, less porous, cellophane film non swelling in water.

Method for Preparation of Cellulose, Films, Filaments, and Fibers With Hole-Free Surfaces Turning now to FIG. 3, Viscose 300 is pumped by a pump 31 through a restricted orifice 32, either a spinneret, for fiber, or a die for film, into a first tank 34 containing an alcohol-salt solution causing the cellulose xanthate to coagulate almost instantly. Coagulated, the film or fiber 301 has sufficient tensile strength to be drawn and guided over rollers 36 into a tank 38 containing an aqueous sat solution. In that tank the film or fiber is washed thoroughly until the gas-forming impurities are removed. Then the film or filament enters a third tank 39 wherein it is contacted with acid to reconstitute the pure cellulose product, either rayon, or cellophane 302. Only on completion of reconstitution may the film or fiber enter another tank for further washing with water, and air drying. The rotation of the rollers 36 may be controlled as required for the strength and dimensions required. Number of additional curing and washing stages can be added as conditions may require.

Example 1

A mixture consisting of 80 liters of polypropylene glycol (MW 1200), 3,610 grams of ethoxylated castor oil with 5 moles of EO [ethylene oxide], 390 grams of ethoxylated sorbitan monooleate with 20 moles of EO was prepared, mixed well until homogeneous and cooled down to below 10 degrees C. Approximately 30 liters of somewhat green viscose maintained at 6 to 8 degrees C. was premixed in approximately 2:1 ratio (volume of PPG/surfactant vs. viscose) through an in-line mixer (commercial Oakes® mixer, Mod. #4MB3A), running at 1,700 Rpm. Outgoing emulsion was placed into a 150 liter jacketed tank under efficient and continuous mixing. (See FIG. 1) The emulsion was mixed and maintained at room temperature for about 55 hours. To test if reaction was over, to a small aliquot (1 to 2 mL) of the reaction mixture equal volume of hexane was added and mixed on a vortex mixer. After decanting, 1 to 2 mL (milliliters) of ethanol was added and vortexed again. After the beads settled down they were easily redispersed on mixing, indicating that viscose had coagulated and a non-sticky skin on individual droplets has been formed. The reaction mixture was then thinned down with 40 liters of hexane, and left overnight to settle. The solvents were decanted, beads were slurried with 20 liters of ethanol, filtered on a sintered glass Buchner funnel and washed with hexane, followed by washing with ethanol. A portion of the beads was regenerated by stirring the beads overnight at room temperature with 20% acetic acid in ethanol. Gas evolution and foaming were noticeable when acid-alcohol solution was added to the beads. After filtering and washing with ethanol the beads were soaked in a large volume of water for 24 hours, filtered and thoroughly washed with large amounts of water. Air-dried beads appear under an electron microscope to be a solid, compact material, although some cavities, channels and cracks were also observed.

Example 2

In a 2-liter beaker equipped with an air-driven mixer were placed 814 grams of polypropylene glycol (MW 1200), 38.8 grams of ethoxylated castor oil with 5 moles of EO, and 4.3 grams of ethoxylated sorbitan monooleate with 20 moles of EO. While stirring, 220 grams of viscose of medium ripeness were added, the reaction was continued for 11 to 12 hours. Then 17 grams of propylene carbonate were added in the course of 2 to 3 minutes. The mixing was continued for another 5 minutes and then the reaction mixture was thinned down with ethanol to about twice the original volume. The beads were left to settle, solvents were decanted and beads were filtered off and washed thoroughly with ethanol. Beads were placed with stirring into 1 liter of 20% acetic acid solution in ethanol (foaming was noticeable), and left for 6 hours. After filtering, beads were washed first with ethanol, then washed several times with water. Air-dried beads appeared to be spheroidal, solid particles with a somewhat rough-looking surface.

Example 3

A polypropylene glycol-surfactant mixture consisting of 108 Liters of polypropylene glycol (MW 1200), 4,875 grams of ethoxylated castor oil with 5 moles of EO and 525 grams of ethoxylated sorbitan monooleate with 20 moles of EO, was prepared and cooled down to 8° C. Said solution was concomitantly pumped with rather green viscose (cooled down to 10°–12° C.) in the ratio of 2:1 by volume, respectively, through the Oakes® mixer (as described in Example 1), run at 2500 rpm. The emulsion was fed into a 150 liter tank with two concentric-shaft mixers (see FIG. 1). The 45 cm perforated mixing blade was run at 82–83 rpm and 16 cm propeller blade was kept at 450 rpm. A total of 87 liters of emulsion were pumped into the tank. After 48 hours of mixing at room temperature 1,450 grams of propylene carbonate were added in the course of 5 minutes, and stirring continued for an additional ½ hour. About 35 liters of ethanol were added to the slurry with stirring and then the mixture was left to settle. A very reddish-colored supernatant liquid with a strong odor of hydrogen sulfide and carbon disulfide was decanted and beads were filtered off. After several washings with ethanol the beads still retained yellowish-brown color. Final washing and cellulose regeneration process is described in Example 5.

Example 4

A pre-cooled mixture of 108 liters of polypropylene glycol (MW1200), 4,875 grams of ethoxylated castor oil with 5 moles of EO and 525 grams of ethoxylated sorbitan monooleate with 20 moles of EO, was concomitantly pumped with about 35 Liters of cool, ripened viscose through the in-line mixer such as a commercial Oakes® mixer (described in Example 1), run at 2,500 Rpm. Volume ratio of PPG-surfactant vs. viscose was 2:1, and the outcoming emulsion had temperature maintained at 26–27 degrees C. The emulsion was fed into a 150 Liter tank provided with efficient mixing as described in Example 3. A total of about 90 Liters of emulsified viscose was introduced into the tank. The mixture was stirred at the same rate as described in the preceding example for an hour, after which the, contents were transferred into a holding tank under continuous agitation. About 35–40 liters of saturated potassium acetate solution in ethanol (approximately 30% concentration) were placed into the 150 liter tank with two coaxial mixers. The viscose emulsion from the holding tank was slowly pumped back into the salt-ethanol solution under vigorous stirring in the course of about 10 minutes, then 25 liters of ethanol were added with stirring and the mixture was left to settle down. Small aliquots were filtered, washed with ethanol and acetone, resulting in a product of fine uniform beads that was easily filterable. Total contents were centrifuged on a continuous centrifuge at a rate of 1 to 1 & ½ liters per minute. The resulting solids were dispersed in ethanol and centrifuged again. The beads when dried were free flowing and of a fine particle size. Final washing and cellulose regeneration was done as described in Example 5.

Example 5

Portions of the beads from Examples 4 and 5, respectively, were treated in the same manner. The beads were washed first with alcohol until the filtrate was only slightly colored yellow. After the beads were dried on filter or obtained as solids on centrifuging, they were soaked in a large excess of 25 to 30% aqueous potassium acetate solution overnight with stirring. After filtering, the beads were continued to be washed with fresh, large amounts of said salt solution until no more color was coming out. Finally, the residual salt was washed out with alcohol. The beads were then transferred into an excess of 20% acetic acid solution in alcohol. Virtually no gassing from beads was evident on contact with acid. The beads were stirred in said acid-alcohol solution for at least 6 hours, then filtered and washed with alcohol. When these beads were placed into deionized water, no substantial swelling was observed. When water was used as a final wash for beads on a Buchner filter some increase of the volume of the beads on the filter bed was observed, but increase in volume was estimated to be no more than 10%. Dried beads appeared under an electron microscope as solid, void free material.

Example 6

This experiment was carried out in the same manner as example 5. After the beads are dried on a filter or obtained as solids on centrifuging, they were soaked in a saturated solution of potassium acetate in ethanol overnight with stirring. After filtering, the beads were again washed with said salt solution in ethanol, and finally, residual salt from salt in ethanol solution was washed out with ethanol alone. The beads were then stirred in a 20% acetic acid in ethanol solution for at least 6 hours, then filtered and washed with alcohol. When these beads were placed into deionized water no swelling was observed. Dried beads appeared under an electron microscope as solid, void-free material.

Example 7

Polypropylene glycol, MW 1200, 150 ml, was mixed with emulsifier, 5 ml, with said emulsifier consisting of 9.7255% of ethoxylated sorbitan monoolate with 20 moles of EO and 90.2745% of ethoxylated castor oil with 5 moles of EO. This was then emulsified with viscose, 75 ml, for 6 minutes on speed #7 of a Waring® blender and resulting mixture was added in total to 30 ml of saturated potassium acetate in ethanol which was stirring during and after this addition on a magnetic stirrer. The resulting product was a fine precipitate; after several washings with 25% K-acetate (potassium acetate) in ethanol and finally with ethanol alone, followed by soaking in 25% acetic acid in ethanol resulted in beads (5.25 g) ranging in size from 1–10 micrometers, which were spherical, dense, and showed no swelling upon contact with water.

Example 8

Toluene, 100 mL, was mixed with emulsifier, 5 mL, with said emulsifier consisting of 9.7255% of ethoxylated sorbitan monoolate with 20 moles of EO and 90.2745% of ethoxylated castor oil with 5 moles of EO; this toluene-surfactant solution was emulsified with 50 mL viscose using a Waring® blender on speed #5 for 3 minutes. After blending was complete, this was added at once to a constantly stirring solution of 80 mL of a saturated potassium acetate solution in ethanol. This was then washed with 25% K-acetate in ethanol and finally with ethanol alone, followed by soaking for 1 hour in 25% acetic acid in ethanol, washing again with ethanol with this particular emulsifying system the resulting cellulose beads are of 150–500 micrometers in size; 3.5 g.

Example 9

Figure 8:
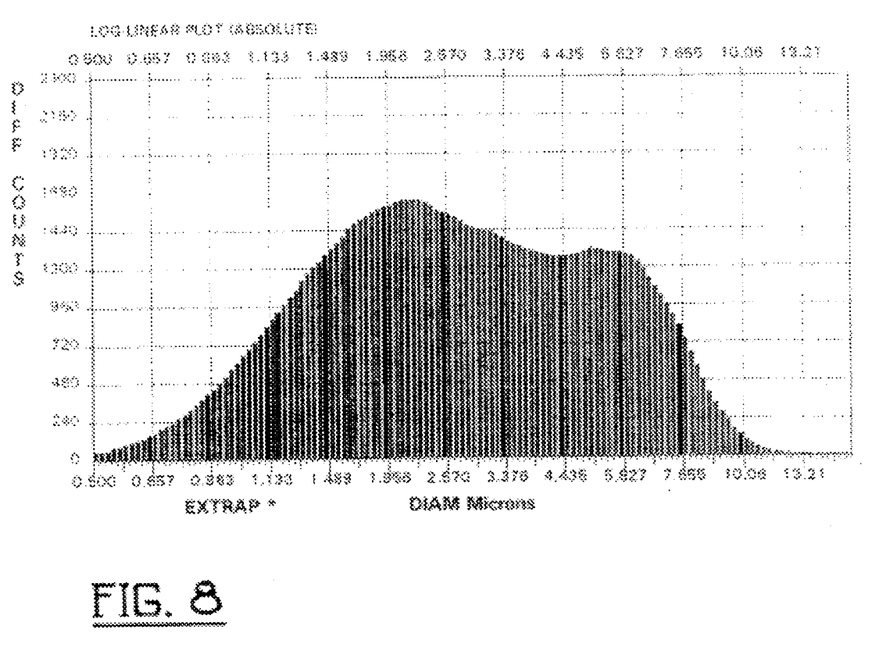
FIG. 8. is a particle size distribution histogram of beads produced using the process of Example 9.

Eleven and four tenths liters of commercial viscose (technical viscose) is placed in a steel container of a planetary Hobart® mixer. The mixer is now turned on at speed setting 2 and 35 Kg. of an emulsifying solution is added in spray form in 52 minutes to the viscose solution. The emulsifying solution consists of 29.59 Kg. of polypropylene glycol 1200 and d-limonene 30:70, w/w, to which 3.5 Kg. of dinonylphenolpolyethoxylate 15 moles of EO, (HLB approximately 13) (Igepal DM 710) has been added. The first eleven and four tenths liters of the emulsifying mixture is added at speed two in 27.5 minutes. On the 31st minute the Hobart® mixer is switched to speed one for the duration of the experiment. Once all the emulsifying mixture has been added, stirring is continued for 10 minutes at speed setting 1. At this point the viscose emulsion is added in a fine stream to 113.5 Kg. of 25% potassium acetate/ethyl alcohol mixture and stirred vigorously by means of a Lightning® mixer. After 16 hours, mixing is discontinued and the cellulose beads are allowed to settle. The supernatant is decanted and the cellulose beads are worked up in the following way; Solvent is removed in a basket centrifuge. The beads are removed from the centrifuge and suspended in ethyl alcohol and stirred for 10 minutes. The alcohol is removed through centrifugation. The beads are then suspended in a 35%, w/w, potassium acetate water solution and are stirred for ten minutes. After centrifugation the process is repeated. The cellulose beads at this stage are almost white. They are then washed with ethyl alcohol and after centrifugation stirred in a 20% , v/v, acetic acid ethyl alcohol solution for at least five hours. The beads are then centrifuged and washed with ethyl alcohol to remove excess of acetic acid. They are washed with water to remove all the alcohol and the wet beads are placed in a 5% sodium phosphate solution containing 6% of hydrogen peroxide at pH 7. The beads are stirred for one hour, the supernatant is centrifuged off and the beads are washed with water to remove traces of hydrogen peroxide and salts. After drying the beads are ready for further modification, and their distribution is shown in FIG. 8.

Example 10

Figure 9:
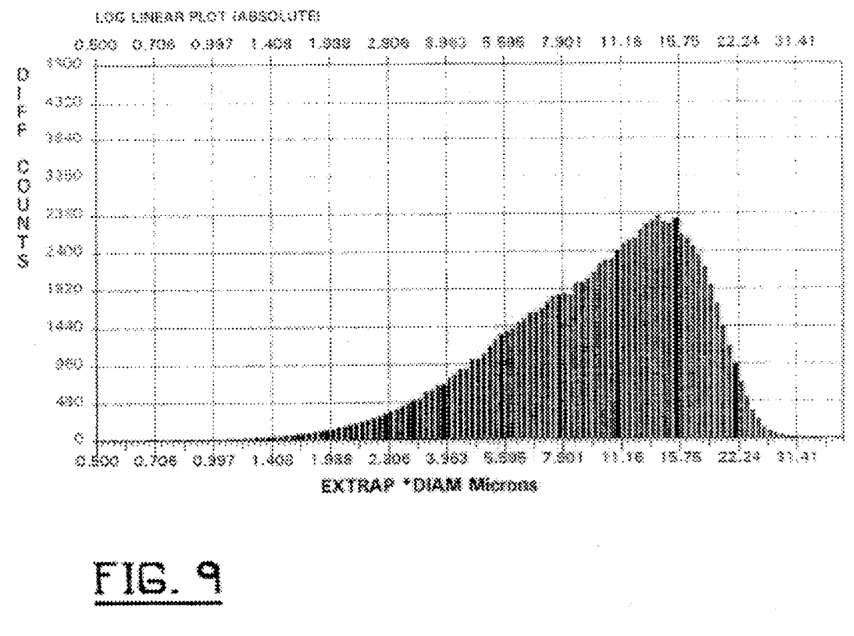
FIG. 9. is a particle size distribution histogram of beads produced using the process of Example 10.

Eleven and four tenths liters of commercial viscose is placed in a steel container of a Hobart® mixer. The mixer is turned on at speed setting 2 and 30.6 Kg. of emulsifying solution are added in a spray form in 58 minutes, to the viscose solution. The emulsifying solvent consists of 25.8 Kg. of polypropylene gylcol 1,200 and d-limonene 30:70, w/w, to which 4.95 Kg. of a dinononylphenolpolyethoxylate as the emulsifier were added. The first eleven and four tenths liters are added in 30 minutes. On the 35th minute the Hobart® mixer is switched to a speed setting of one for the remainder of the experiment. From this moment on, the cellulose beads are worked up as described in Example 9. Their size distribution histogram is shown in FIG. 9.

Example 11

Seventy-five grams of 10% dinonylphenolpolyethoxylate emulsifier (52.37% of Igepal DM 730/47.63% Igepal DM 530) in 30/70 w.w. polypropylene glycol 1200/D-limonene mixture were incrementally added to 37.5 grams of viscose mixed continuously with a hand-held egg beater which was plugged into a variable voltage transformer and maintained at approximately 60 volts. At that voltage the egg-beater was used at its lowest speed setting. After 73 grams of above 10% surfactant solution mixture was added, the mixture was still not inverted. To the remaining 2 grams of 10% surfactant solution mixture was added an additional 0.75 grams of a mixture containing 52.37% and 47.63% of Igepal DM 730 and DM 530, respectively. Upon the addition of these 2.75 grams of surfactant solution, the emulsion quickly thinned out and formed a fluid emulsion. The resulting emulsion was added into 230 ml of 25% potassium acetate in ethanol solution with magnetic stirring. After approximately ½ hours the suspension was filtered, washed with 25% alcoholic potassium acetate, then alcohol, followed with 35% aqueous potassium acetate, then alcohol and finally reacted with 20% alcoholic acetic acid solution for five hours. After filtering and washing with alcohol, water, alcohol and acetone, the beads were observed under the microscope. The average diameter of the resulting beads was estimated to be 20–25 microns.

Example 12

1 gm of cellulose beads, 40 to 60 microns, is soaked for 12 hours at room temperature in 5 ml of 0.1M solution of tetrabutylammonium hydroxide (Benzene - Methanol 9:1). 5 ml of 1,4-butanediol diglycidyl ether is now added and the solution is mixed for 4 hours at 45 C. The beads are filtered, washed with methanol and suspended in a 5 ml solution of acetonitrile containing Jeffamine® ED 2001 (20 gms. Jeffamine 2001 in 100 ml acetonitrile). The suspension is stirred and heated at 50 degrees C. for 12 hours. The beads are filtered and washed with methanol. Traces of Jeffamine are removed by extraction with boiling methanol in a soxhlet. After drying at room temperature the primary amine content on the bead surface is determined by the method of Gaur, R. K.; et al; Anal. Biochem., 1989, 180, 253–258. Primary amine content 15.2 µmoles per ml bed.

Example 13

1 gm of cellulose beads, 40 to 60 microns, is soaked for 12 hrs of room temperature in 5 ml of 0.2M solution tetrabutylammonium hydroxide in water. 5 ml of 1.4 butanediol diglycidyl ether is added and the suspension is stirred at room temperature for 4 hours. After cleaning the beads as in example 12, 5 ml of Jeffamine 2001 solution in acetonitrile (20 gms of Jeffamine 2001 in 100 ml acetonitrile) are stirred with the cellulose beads for 4 hours at room temperature. Cleaning and amino content determination were performed as in Example 12. Primary amine content: 8.2 µmoles per ml bed.

Example 14

1 gm cellulose beads, 40 to 60 microns, are soaked for 12 hours at room temperature in 5 ml of 0.2M solution tetrabutylammonium hydroxide in water. 10 ml of epichlorhydrine is now added and the beads are stirred on the rotoevaporator for 3 hours at 60 C. After cleaning (see Example 12) 5 ml of a methanol solution of Jeffamine® E D 6000 (60 gms of Jeffamine 6000 in 100 ml methanol) is added and the suspension is refluxed for 12 hours. Cleaning and amine determination are performed as in Example 12. Primary amine content: 5.1 µmoles per ml bed.

Example 15

1 gm of cellulose beads (40 to 60 microns) are treated with tetrabutylammonium hydroxide solution as in Example 14. They are now treated with a methanolic solution of Jeffamine 2001 (20 gms of Jeffamine 2001 in 100 ml methanol). Cleaning and amine determination are performed as in Example 12. Primary amine content 16.1 µmoles per ml bed.

TABLE IV

The following table gives examples of, but is not limited to, a wide variety of choices described in this invention regarding metal salts soluble in alcohols, solvents for salts used in breaking the emulsion lower, alcohols, which are miscible with water in all proportions, which may be used other than ethanol, solvents for viscose emulsification and the use of various carbonates as sources of carbonic acids.

METAL SALTS SOLUBLE IN ETHANOL AND/OR METHANOL

From the foregoing examples, and from the cited literature, it will be apparent that there is a wide choice of salts for the processes described. The following is a list of operable salts:
1. Chlorides of: Mg++, Ca++, Mn++, Fe++, and Zn++
2. Bromides of: Li+, Mg++, Ca++, Mn++, Fe++, and Zn++
3. Iodides of: Li+, Mg++, Ca++, Mn++, Fe++, and Zn++
4. Nitrates of: Li+, Ca++, Mn++, and Zn++
5. Thiocyanates of: Li+, Na+, K+, Ca++, Fe++, and Zn++
6. Formates of: Na+, and K+,
7. Acetates of: Li+, K+, Mg++, Mn++, Fe++, and Zn++,
8. Propionates of: Na+, and K+,
9. Lactates of: Na+, Mn++, and Zn++, and
10. Salicylates of: Li+, Na+, and Ca++.

SOLVENTS FOR SALTS AND THE BREAKING OF EMULSIONS

Protic and aprotic polar solvents, glycols, and alcohols, in particular.

ALCOHOLS OTHER THAN ETHANOL

Methanol, propanol and isopropanol. Glycols such as ethylene and propylene glycols. Lower alcohols satisfy both requirements, breaking up and thinning of the emulsions and high solvency for the salt.

SOLVENTS FOR VISCOSE EMULSIFICATION

Polypropylene glycol, polybutylene glycol, polytetrahydrofurane, and their block co-polymers with polyetylene glycol, glycol ethers, aliphatic, naphthenic (alicyclic) such as d-limonene, and aromatic hydrocarbons.

CARBONATES

Ethylene carbonate, propylene carbonate, dimethylcarbonate, and diethyl carbonate.

The preferred embodiment of this invention is as a chromatographic support.

We claim:

1. A chromatography support comprising spheroidal, rigid beads of regenerated cellulose, wherein said beads each have an integral nonporous outer skin, said skin demonstrating no holes, cracks or voids at a magnification of 6,000×, and wherein said beads retain their structural integrity in aqueous solutions under operating chromatographic column pressures at least of 100 p.s.i., wherein said beads swell not more than 15% of their original volume when immersed in aqueous solutions, and wherein said beads are essentially non crystalline as determined by X-ray diffractometry.

2. A support according to claim 1 further comprising chromatographic ligands covalently linked to said skin, wherein all substrate/sorbent interactions take place exclusively on the outside surface of said bead.

3. Cellulose beads as described by claim 2 wherein said chromatographic ligands are covalently linked to said skin via hydrophilic alpha, omega-diamino polyethylene glycol molecules.

4. A cellulose bead as defined by claim 1 wherein any holes and any voids are not discernible in said skin at a magnification of 25,000×.

5. A liquid-chromatography support comprising spheroidal cellulose beads:
   (a) wherein each said bead has an integral outer skin apparently non-porous at 6,000× magnification;
   (b) said skin being impervious to nitrogen under the B.E.T. method of measuring surface area;
   (c) said beads swelling not more than 15% of their original volume when immersed in an aqueous solution; and
   (d) said beads being essentially non crystalline as determined by X-ray diffractometry.

6. A liquid chromatography support comprising spheroidal cellulose beads as in claim 5, wherein hydroxyl groups of said skin were activated by immersing said bead in an aqueous 0.2 molar solution of tetrabutylammonium hydroxide for approximately 12 hours at room temperature and at a pH 12.5 enabling thereby hydroxyl groups to form covalent bonds with other molecules.

7. A liquid chromatography support comprising spheroidal cellulose beads as in claim 5, wherein hydroxyl groups of said skin were activated by immersion in a mixture comprising:
   (a) 0.1 molar aqueous solution of tetrabutylammonium hydroxide; and
   (b) a solvent comprised of about nine parts benzene to one part methanol for 12 hours at room temperature enabling thereby said hydroxyl groups to form covalent bonds with other molecules.

8. A liquid chromatography support as described in claim 5, wherein said beads have an average diameter of less than 25 microns.

9. A method for producing a film of reconstituted cellulose, said film having a surface skin manifesting no holes, cracks or voids at a magnification of 6,000×, said film swelling no more than 15% of its original volume in aqueous solutions, said film being essentially non crystalline as determined by X-ray diffractometry, said method comprising the steps of:
   (a) extruding said viscose through a die into a concentrated alcoholic salt solution to coagulate said viscose, said viscose thereby attaining the configuration of said film;
   (b) immersing said film in an excess of a solution of a dehydrating salt in an organic solvent, said organic solvent selected from the group consisting of alcohols, glycols, and esters and ethers of glycols, said film now comprising coagulated cellulose xanthate with surface skin rendered non-sticky;
   (c) washing residual impurities from said coagulated cellulose xanthate film, thereby preserving said non-sticky skin and preventing holes or cracks in said skin by immersing said film in a highly concentrated aqueous solution of at least 25% salt by weight, wherein said salt is selected from the group consisting of chlorides of calcium and magnesium; bromides of lithium, manganese, and calcium; iodides of lithium, magnesium, and calcium; nitrates of lithium and calcium; thiocyanates of lithium, sodium, potassium, and calcium; formates of sodium and potassium; acetates of lithium, potassium, magnesium, and sodium; propionates of sodium and potassium; lactate of sodium; and salicylates of lithium, sodium, and calcium;
   (d) washing residual salt and water from said film with alcohol prior to acid/alcohol regeneration of cellulose;
   (e) regenerating cellulose by immersion of said film in approximately 5% to 25% by weight acid solution, wherein said alcohol is selected from the group of alcohols miscible with water in all proportions, wherein said acid is selected from the group consisting of carboxylic acids, organic sulfonic acids, and inorganic acids;
   (f) washing said film with water; and
   (g) air drying said film.

10. The method of claim 9 wherein said film is comprised of cellophane.

11. A method for producing a filament of reconstituted cellulose, said filament having a surface skin manifesting no holes, cracks or voids at a magnification of 6,000×, said filament swelling no more than 15% of its original volume in aqueous solutions, said filament being essentially non crystalline as determined by X-ray diffractometry, said method comprising the steps of:
   (a) at a temperature of less than 30° C., extruding said viscose through a spinerette into a concentrated alcoholic salt solution to coagulate said viscose, said viscose attaining the configuration of said filament;
   (b) immersing said filament in an excess of a dehydrating salt solution in an organic solvent, said organic solvent selected from the group consisting of alcohols, glycols, and esters and ethers of glycols, whereby said filament comprises coagulated cellulose xanthate, said surface skin being non-sticky;
   (c) washing impurities from said coagulated cellulose xanthate filament, thereby preserving said non-sticky skin and preventing holes or cracks in said skin by immersion in a highly concentrated aqueous solution of at least 25% by weight salt, wherein said salt is selected from the group consisting of chlorides of calcium and magnesium; bromides of lithium, magnesium, and calcium; iodides of lithium, magnesium, and calcium; thiocyanates of lithium, sodium, potassium, and calcium; formates of sodium and potassium; acetates of lithium, potassium, magnesium, and sodium; propionates of sodium and potassium; lactate of sodium; and salicylates of lithium and calcium;

(d) washing residual salt and water from said filament with alcohol prior to acid/alcohol regeneration of said cellulose;

(e) regeneration of cellulose by immersion of said filament in 5% to 25% by weight acid solution, wherein said alcohol is selected from the group of alcohols miscible with water in all proportions, wherein said acid is selected from the group consisting of carboxylic acids, organic sulfonic acids, and inorganic acids;

(f) washing said filament with water; and (g) air drying said filament.

12. The method of claim 11 wherein said filament is comprised of rayon.

13. A three-dimensional article comprised of cellulose, said cellulose being reconstituted from viscose, said article having a skin demonstrating no cracks, holes or voids with magnification of 6,000×, said article having a length greater than its width, said article swelling no more than 15% in aqueous solutions and said article is essentially non crystalline as determined by X-ray diffractometry.

14. A liquid chromatography support comprising spheroidal cellulose beads:

(a) having an integral outer skin apparently nonporous at 25,000× magnification;

(b) said beads being impervious to nitrogen under the B.E.T. method of measuring surface area;

(c) said beads swelling not more than 15% of their original volume when immersed in an aqueous solution; and (d) said beads are essentially non crystalline as determined by X-ray diffractometry.

15. A method for producing an article of manufacture, formed from reconstituted cellulose, characterized in that it swells no more than 15% of its original volume in aqueous solutions of pH less than 13, and having a surface skin which reveals no holes or voids at 6,000× magnification, said article of manufacture is essentially non crystalline as determined by X-ray diffractometry, said method comprising the following steps:

(a) at a temperature less than 30° C., extruding viscose through a die into a concentrated alcoholic salt solution to coagulate said viscose thereby attaining the configuration of said article;

(b) immersing said article in a solution of a dehydrating salt in an organic solvent, said organic solvent selected from the group consisting of alcohols, glycols, and esters and ethers of glycols, said article then comprises coagulated cellulose xanthate with surface skin rendered non-sticky;

(c) washing residual impurities from said coagulated cellulose xanthate article, thereby preserving said non-sticky skin and preventing holes and cracks in said skin by immersing said article in a highly concentrated aqueous solution of at least 25% salt by weight, wherein said salt is selected from the group consisting of chlorides of calcium and magnesium; bromides of lithium, magnesium, and calcium; iodides of lithium, magnesium, and calcium; nitrates of lithium and calcium; thiocyanates of lithium, sodium, potassium, and calcium; formates of sodium and potassium; acetates of lithium, potassium, magnesium, and sodium; propionates of sodium and potassium; lactate of sodium; and salicylates of lithium, sodium, and calcium;

(d) washing residual salt and water from said article with alcohol prior to acid/alcohol regeneration of cellulose;

(e) regenerating cellulose by immersion of said article in approximately 5% to 25% by weight acid/alcohol solution, wherein said alcohol is selected from the group of alcohols miscible with water in all proportions, wherein said acid is selected from the group consisting of carboxylic acids, organic sulfonic acids, and inorganic acids;

(f) washing said article with water; and (g) air drying said article.

16. A method for producing a cellulose article as defined by claim 15, said method further characterized by a plurality of washings of said article with aqueous solutions, said solutions comprising at least 25% salt by weight, said washings preventing gassing and foaming of said article upon subsequent contact with acids.

17. A method for producing regenerated cellulose beads from viscose, said beads having skins without holes and cracks discernable under 6,000× magnification, said beads swelling no more than approximately 15% in aqueous solutions, said beads being essentially non crystalline as determined by X-ray diffractometry, said method comprising the steps of:

(a) at a temperature less than 30° C., forming an emulsion of viscose with at least one emulsifying agent and a liquid carrier, wherein said carrier is an organic solvent immiscible with water, to produce small, individual viscose droplets;

(b) blending said viscose emulsion into a dehydrating solution of a salt in a hydrophilic organic solvent, said solvent selected from the group consisting of alcohols, glycols, and esters and ethers of glycols, to coagulate said droplets as beads;

(c) washing impurities from said coagulated cellulose xanthate beads using an aqueous solution of no less than 25% concentration by weight of salt, said salt selected from the group consisting of chlorides of calcium and magnesium; bromides of lithium, magnesium, and calcium; iodides of lithium, magnesium, and calcium; nitrates of lithium and calcium; thiocyanates of lithium, sodium, potassium, and calcium; formates of sodium and potassium; acetates of lithium, potassium, magnesium, and sodium; propionates of sodium and potassium; lactate of sodium; and salicylates of lithium, sodium, and calcium;

(d) washing residual aqueous salt from said beads with an alcohol selected from the group of alcohols miscible with water in all proportions; and (e) regenerating cellulose in said beads by immersing said beads in an acidified alcohol solution, wherein said alcohol solution comprising acids selected from the group consisting of carboxylic acids, organic sulfonic acids and inorganic acids.

18. A method of producing cellulose beads for liquid chromatography supports according to claim 17 wherein:

(a) an emulsifying agent selected from the group consisting of anionic, cationic and nonionic surfactants is used as a primary emulsifier;

(b) i in further combination with linear or globular anionic, cationic or nonionic polymers, said polymers functioning as protective colloids for said emulsion.

19. The method of claim 17 wherein said acid is hydrochloric acid in an effective concentration.

20. The method described in claim 17 wherein the amount of solution of potassium acetate in ethyl alcohol is at least twice the amount of viscose emulsion on a volume per volume basis.

21. The method as described in claim 17 wherein a water immiscible carrier is comprised of a mixture of d-limonene and a polypropylene glycol.

22. The method as described in claim 21 wherein the amount of polypropylene glycol is approximately 20% to 50% by weight of said water-immiscible carrier.

23. The method as described in claim 21 wherein the concentration of said polypropylene glycol is approximately 30% of said water-immiscible carrier.

24. The method according to claim 17 wherein said salt solution for washing comprises no less than 25% by weight potassium acetate at room temperature.

25. The method as described in claim 17 wherein said acid is acetic acid in an effective concentration.

26. The method as described in claim 17 wherein said acidified alcohol solution is 5% to 25% acid by weight, and said alcohols are selected from the group of alcohols miscible with water in all proportions.

27. A method according to claim 17 with the further step of activating the hydroxyl groups of said skin by immersion in a mixture comprising:
   (a) 0.1 molar aqueous solution of tetrabutylammonium hydroxide; and
   (b) a solvent comprised of about nine parts benzene to one part methanol for 12 hours at room temperature, enabling thereby said hydroxyl groups to form covalent bonds with other molecules.

28. A method according to claim 17 with the further step of activating the hydroxyl groups of said skin by immersing said bead in an aqueous 0.2 molar solution of tetrabutylammonium hydroxide for approximately 12 hours at room temperature and at pH 12.5 enabling thereby hydroxyl groups to form covalent bonds with other molecules.

29. The method of claim 17 wherein
   (a) said carboxylic acids are selected from the group consisting of acetic, propionic, formic, oxalic, and lactic acids;
   (b) said sulfonic acids are selected from the group consisting of methane sulfonic acid, benzene, toluene, and xylene sulfonic acids; and
   (c) said inorganic acids are selected from the group consisting of hydrochloric and hydrobromic acids.

30. A method for producing spherical cellulose beads which swell no more than 15% in aqueous solutions, according to the method of claim 17, said method further comprising the steps of:
   (a) at a temperature less than 30° C., forming an emulsion of viscose with at least one emulsifying agent and a liquid carrier, wherein said liquid carrier is an organic solvent immiscible with water, said process initially forming droplets of viscose;
   (b) adding to said emulsion 1.5% to 2.5% by weight carbonic acid ester to buffer the high alkalinity of said viscose by liberation of $CO_2$ in said emulsion, thereby accelerating coagulation of cellulose xanthate;
   (c) washing said beads with a highly concentrated, 25% to 35% by weight aqueous salt solution, wherein said salt is selected from the group consisting of chlorides of calcium and magnesium; bromides of lithium, magnesium, and calcium; iodides of lithium, magnesium, and calcium; nitrates of lithium and calcium; thiocyanates of lithium, sodium, and potassium; formates of sodium and potassium; acetates of lithium, potassium, magnesium, and sodium; propionates of sodium and potassium; lactate of sodium; and salicylates of lithium, sodium, and calcium;
   (d) washing residual salt from said beads with an alcohol selected from the group of alcohols miscible with water in all proportions; and
   (e) regenerating cellulose in said beads by immersing said beads in an acidified alcoholic solution wherein acid concentration is approximately 5% to 25% by weight, wherein:
      (i) said acid is selected from the group consisting of carboxylic acids, organic sulfonic acids, and inorganic acids; and
      (ii) said alcohols are selected from the group of alcohols miscible with water in all proportions.

31. The method according to claim 30 wherein said carbonic acid ester is selected from the group consisting of dimethyl carbonate, diethylcarbonate, ethylene carbonate and propylene carbonate.

32. The method of claim 30, wherein said salt solution for washing said beads comprises no less than 25% by weight potassium acetate at room temperature.

33. The method of claim 30 wherein said alcohol solution is methanol.

34. The method of claim 30 wherein said salt solution for washing said beads comprises no less than 25% by weight magnesium chloride.

35. The method according to claim 30 wherein said carbonic acid ester is propylene carbonate.

36. The method of claim 30 wherein said organic solution consists primarily of ethanol.

* * * * *

UNITED STATES PATENT AND TRADEMARK OFFICE
CERTIFICATE OF CORRECTION

PATENT NO. : 5,656,373
DATED : August 12, 1997
INVENTOR(S) : Ioannis Scarpa

It is certified that error appears in the above-identified patent and that said Letters Patent is hereby corrected as shown below:

On the Title page, item [76] Inventors:  --Anita Preininger – should be added as an inventor.

Signed and Sealed this

Twenty-sixth Day of May, 1998

Attest:

BRUCE LEHMAN

*Attesting Officer*      *Commissioner of Patents and Trademarks*